(12) United States Patent
Al-Samadi

(10) Patent No.: US 8,241,503 B2
(45) Date of Patent: Aug. 14, 2012

(54) ENHANCED HIGH WATER RECOVERY MEMBRANE PROCESS

(76) Inventor: Riad Al-Samadi, Burlington (CA)

( * ) Notice: Subject to any disclaimer, the term of this patent is extended or adjusted under 35 U.S.C. 154(b) by 0 days.

(21) Appl. No.: 13/184,588

(22) Filed: Jul. 18, 2011

(65) Prior Publication Data
US 2011/0266224 A1 Nov. 3, 2011

Related U.S. Application Data

(62) Division of application No. 12/541,482, filed on Aug. 14, 2009, now Pat. No. 7,981,295.

(60) Provisional application No. 61/136,137, filed on Aug. 14, 2008.

(51) Int. Cl.
- B01D 61/02 (2006.01)
- B01D 61/04 (2006.01)
- B01D 61/08 (2006.01)
- B01D 21/01 (2006.01)

(52) U.S. Cl. ........ 210/652; 210/638; 210/641; 210/650; 210/651; 210/660; 210/702; 210/703; 210/705; 210/712; 210/713; 210/723; 210/724; 210/725; 210/729; 210/738; 210/749; 210/767; 210/768; 210/805; 210/806; 210/663; 210/669

(58) Field of Classification Search .......... 210/638, 210/641, 650, 651, 660, 663, 669, 702, 703, 210/705, 712, 713, 723, 724, 725, 729, 738, 210/749, 767, 768, 805, 806
See application file for complete search history.

(56) References Cited

U.S. PATENT DOCUMENTS

| | | | | |
|---|---|---|---|---|
| 4,392,959 A * | 7/1983 | Coillet | ............................ | 210/638 |
| 5,501,798 A * | 3/1996 | Al-Samadi et al. | ........... | 210/652 |
| 6,113,797 A * | 9/2000 | Al-Samadi | .................... | 210/652 |
| 6,416,668 B1 * | 7/2002 | Al-Samadi | .................... | 210/636 |
| 6,461,514 B1 * | 10/2002 | Al-Samadi | .................... | 210/652 |

* cited by examiner

Primary Examiner — John Kim
(74) Attorney, Agent, or Firm — Hodgson Russ LLP

(57) ABSTRACT

Disclosed is an economical process for the purification of water containing soluble and sparingly soluble inorganic compounds using single-stage or two-stage membrane processes that integrate membrane water purification with chemical precipitation softening and residual hardness and silica removal from the membrane concentrates using ion exchange resins and silica sequestering media, respectively.

3 Claims, 15 Drawing Sheets

ENHANCED HIGH WATER RECOVERY MEMBRANE PROCESS

This application is a divisional application of U.S. patent application Ser. No. 12/541,482, filed Aug. 14, 2009 now U.S. Pat. No. 7,981,295, which claims priority to U.S. provisional application No. 61/136,137, filed Aug. 14, 2008, the disclosures of each of which are incorporated herein by reference.

BACKGROUND OF THE INVENTION

This invention relates to the economical purification of water containing soluble and sparingly or partially soluble inorganic compounds using single-stage or two-stage membrane processes that integrate membrane water purification with chemical precipitation softening and complete hardness and silica removal using ion exchange resins and silica sequestering beds, respectively.

Hardness compounds such as barium, calcium, magnesium, iron, carbonate, bi-carbonate, fluoride, sulfate and silica are commonly found in surface water sources such as lakes and rivers, groundwater sources such as water wells and aquifers and in aqueous industrial effluents including cooling tower blow-down, boiler blow-down and landfill leachates. These sparingly soluble contaminants limit the percentage recovery of purified water permeate from reverse osmosis (RO) and nano-filtration (NF) membrane systems, as they tend to form scale compounds upon concentration, which deposit, often irreversibly, on the surface of the membranes and reduce their useful service life.

In order to prevent premature fouling and deposition of scale compounds on the RO or NF membrane surfaces, the raw water is pre-treated by adding acid to increase the solubility of "temporary" hardness compounds, by using ion exchange softening to remove hardness ions, or by chemical precipitation of the hardness compounds and silica using "cold lime" or "hot lime" softening processes. When chemical precipitation softening pretreatment is required, this step is followed by clarification, preferably using solids contact clarifier and filtration using gravity or pressure sand filters, multimedia filters or "fine media" pressure filters. Alternatively, the clarified supernatant can be filtered by ultrafiltration or microfiltration membranes where any entrained suspended solids and fine colloids from the clarifier are completely removed, producing a membrane filtrate with very low 15-minute silt density index ($SDI_{15}$) of <3 which is suitable for purification and desalting using reverse osmosis (RO) membranes or nanofiltration (NF) membranes.

In order to increase the recovery percentage of RO or NF membrane permeate, the pre-concentrated sparingly soluble compounds can be further precipitated by the addition of lime or sodium hydroxide in an inter-stage RO concentrate softening step, followed by additional clarification of the precipitated hardness compounds and silica, filtration of the clarifier supernatant and purification through a second RO or NF membrane stage to achieve further permeate recovery. However, these processes are limited to achieving overall (i.e. total) 2-stage membrane system recoveries in the range 80%-85%.

A survey of prior art shows the following patents:

U.S. Pat. No. 4,000,065 discloses the use of a combination of reverse osmosis (RO) and ultrafiltration (UF) to separate organic material from the aqueous stream. The contaminated aqueous stream is circulated from the high pressure compartment of an RO unit to the high pressure compartment of a UF unit, then to the low pressure compartment of the UF unit and then back to the high pressure compartment of the RO unit.

Japanese Patent 57-197085 discloses a filtration apparatus that comprises connecting UF apparatus and RO apparatus in series so as not to deposit scale on the RO membrane.

U.S. Pat. No. 3,799,806 discloses purification of sugar juices by repeated ultrafiltration and reverse osmosis purification steps.

U.S. Pat. No. 4,083,779 discloses a process for treatment of anthocyante extract by ultrafiltration and reverse osmosis treatments.

U.S. Pat. No. 4,775,477 discloses a process for extraction of cranberry presscake wherein the presscake is ground and subjected to microfiltration to remove colloidal high molecular weight compounds followed by reverse osmosis to recover a red-colored solution.

U.S. Pat. No. 5,182,023 discloses a process for removing arsenic from water wherein the water is first filtered to remove solids then passed through an ultrafilter, followed by a chemical treatment to adjust pH to a range from about 6 to 8. Thereafter, scale-inhibitors and anti-fouling materials are added before subjecting the water to reverse osmosis to provide a stream having less than about 50 ppb of arsenic.

Japanese Patent 53025-280 discloses the separation of inorganic and organic compounds from a liquid by first using a reverse osmosis membrane and then using a second reverse osmosis membrane having a more permeable membrane such as a microporous or ultrafiltration membrane. Part of the contaminated liquid obtained from the first membrane is processed through the second membrane.

U.S. Pat. No. 5,501,798 discloses a high recovery water purification process involving the use of reverse osmosis followed by chemical precipitation of hardness compounds from the RO concentrate followed by microfiltration to separate precipitated solids and recycling of the "suspended solids' free concentrate" back to the RO.

U.S. Pat. Nos. 5,925,255 and 6,537,456 disclose a process in which the calcium and magnesium hardness in the raw water is completely removed using hydrogen form or sodium-form weak acid cation ion exchange (IX) softening resin, followed by pH elevation by adding sodium hydroxide to increase the silica solubility and prevent its precipitation as membrane permeate recovery is increased. The pH elevation also mitigates biological fouling. This process achieves a permeate recovery of 90% or more, depending on the raw water TDS and membrane system operating pH.

U.S. Pat. No. 6,113,797 discloses a 2-stage high recovery membrane process, where the pre-concentrated hardness and silica in the RO or NF membrane concentrates are removed by chemical precipitation or by ion exchange if silica is not present in limiting concentrations, since silica is not removed by IX resins. This prior art process discloses softening and recycling of the high TDS $2^{nd}$ stage membrane concentrate and blending it with the first stage RO membrane concentrate to enable further purification and water recovery from the second stage, thereby achieving overall permeate recoveries >95% in an economical manner, without resort to using costly multiple, discreet inter-stage softening and membrane stages.

U.S. Pat. No. 6,461,514 discloses a single stage high recovery membrane process, where the pre-concentrated hardness in the RO or NF membrane concentrates is removed by ion exchange. The softened high TDS membrane concentrate is recycled and blended with the raw Influent Water to enable further purification and water recovery, thereby achieving overall permeate recoveries >95% in an economical manner.

In all Prior Art silica-limiting applications where the hardness and silica compounds are precipitated simultaneously by elevating the pH with calcium hydroxide (lime), sodium hydroxide or other alkali solutions, it is necessary to provide effective and intimate contacting between the high pH water and the precipitated suspended solids. Efficient solids contacting will improve the extent of reaction of hardness precursors with the chemical reagents, resulting in higher hardness and silica precipitation efficiencies. The lower the residual sparingly soluble hardness and silica compounds in the clarifier supernatant, the higher the extent of achievable permeate recovery by the membrane system since the recovery is limited by solubility of these compounds, which will further concentrate over the membrane surface. The precipitated solids are removed by using a coagulant and/or a polymeric flocculant to enhance settling of the solids, enabling their removal from the bottom of the clarifier, while reducing the concentration of entrained fine particles that may be carried over into the filtration train downstream.

There have been many clarifier process enhancements aimed at maximizing the efficiency of precipitation and subsequent settling and removal of hardness compounds and silica. Recycling of slurry containing precipitated solids from the bottom of the clarifier to the mixing/reaction zone has been practiced for decades. Some companies have introduced a method of seeding of hardness particles to provide nucleation sites that will enhance the effectiveness of the precipitation process. Others introduce inert sand-like particles of relatively small particle size to provide a large contacting surface over which the precipitation reactions can take place, achieving higher hardness and silica precipitation rates, thus enabling use of smaller retention times in the clarifier and reducing its capital cost. However, this process is rather complex, involving separation and recovery of the inert solids in an external cyclonic separator and recycling back to the clarifier, with the loss of some of the inert solids, thus adding to the waste sludge volume generated and increasing the operating and maintenance costs.

As it can be seen, these prior art processes have limitations since they can not ensure very low residual hardness and silica concentrations in the clarifier supernatant on a consistent basis. There are many variables that affect the clarifier performance, including the influent water temperature, the pH, the dosage of alkali chemicals, coagulants and flocculants which are dependent on the flowrates and the concentrations of sparingly soluble compounds in the influent water. Furthermore, the equipment enhancements described above, while offering increased effectiveness and improved precipitation performance, are costly and involve substantial additional operating and maintenance costs. Significant concentrations of hardness cations (i.e. calcium and magnesium) still remain in the clarifier supernatant.

Since it is critical to maximize the overall membrane process permeate (i.e. purified water) recovery, in view of increasing worldwide water costs, water shortages and the escalating need for municipal and industrial water reclamation, what is needed therefore is a reliable process that is less susceptible to the above-described limitations. What is needed is a process and processes that will ensure very high efficiencies of removal of the hardness and silica compounds and achieve high overall recoveries >95%, irrespective of the influent water quality, the influent water hardness and silica concentrations, flowrate or operational problems and inefficiencies associated with the "solids" precipitation equipment.

SUMMARY OF THE INVENTION

It is an object of the invention to provide an improved process for the treatment of small and large flowrates of Influent Water from natural sources or wastewater containing "sparingly soluble" inorganic scale-forming compounds.

It is another object of the invention to provide an improved process using a single stage or 2-stage membrane process to purify the Influent Water and recover 67%-99.9% of the water as purified water without incurring the risk of precipitation of scale-forming compounds on the surface of the membranes which reduces the life of the membranes.

It is still another object of the invention to prevent precipitation of scale-forming compounds on the membrane surface by chemically precipitating said compounds from the membrane concentrate in an external recycle loop by adding a suitable alkali compound, followed by coagulating, flocculating and removing said precipitated compounds thereby producing a chemically softened membrane concentrate for further water recovery and recycling.

Yet it is another object of the invention to enhance the membrane concentrate softening process by removing residual hardness and silica from said chemically softened membrane concentrate, using an ion exchange softening resin, a silica sequestering media or both, to ensure consistent and almost complete removal of said scale-forming compounds from the membrane concentrate, thus preventing deposition on the membrane surface, preventing permeate flux loss and preventing premature cleaning and/or membrane replacement.

These and other objects of this invention will become clear from the specification, claims and drawings appended hereto.

In accordance with these objects, there is provided an improved membrane process for the treatment of water from natural sources or wastewater containing "sparingly soluble" inorganic scale-forming compounds wherein very high permeate recoveries in the range 67%-99.9% are achieved in a reliable and consistent manner. The Influent Water, containing the inorganic scale-forming compounds as well as completely soluble inorganic and low concentrations of organic compounds is first pre-treated in order to separate virtually all of the suspended matter including oil and grease by using an oil separation device, followed by chemical coagulation, flocculation, clarification and/or gravity settling, and multi-media filtration. Alternatively, the Influent Water is pre-filtered using micro-media (i.e. fine particle) filtration, micro-filtration membranes or ultra-filtration membranes to effectively separate all of the suspended solids and colloidal matter. If iron is also present in the Influent Water, the water must be aerated using appropriate in-tank air spargers before coagulation, flocculation and/or filtration.

The pre-treated Influent Water in the present invention is purified by a 2-stage or single stage membrane system operating at suitable pressures depending on the concentration of soluble compounds in the Influent Water and the desired overall permeate recovery. In order to prevent formation of scale compounds on the membranes, the membrane concentrate (also known as retentate) is softened by adding a suitable alkali compound to raise the pH and precipitate the sparingly-soluble hardness compounds, followed by coagulating, flocculating and removing said precipitated compounds in a clarifier or settling tank.

The chemically softened membrane concentrate is further softened by using ion exchange (IX) water softening resins, silica sequestering media or a combination of both to ensure almost complete removal of residual cationic scale precursors (i.e. calcium, magnesium, barium, iron, aluminum, amongst other sparingly soluble multi-valent ions) which will otherwise cause scale formation on the membranes and reduce the process reliability and its ability to consistently achieve the desired permeate recoveries in the range 67% to 99.9%. The completely softened membrane concentrate will contain a high concentration of soluble ions, also known as the total dissolved solids (TDS). The softened membrane concentrate is recycled and blended with the Influent Water in the case of the single-stage process, or blended with the first stage membrane concentrate in the case of the 2-stage process to undergo further purification. A small volume of concentrate is removed from the system upstream from the IX water softening resin, combined with a small slurry reject stream from the bottom of the clarifier and disposed of as an overall process reject stream, in order to control the membrane's osmotic pressure, prevent precipitation and control the overall membrane system's permeate recovery in the range 67%-99.9%.

DETAILED DESCRIPTION OF THE PREFERRED EMBODIMENTS

Figure 1:
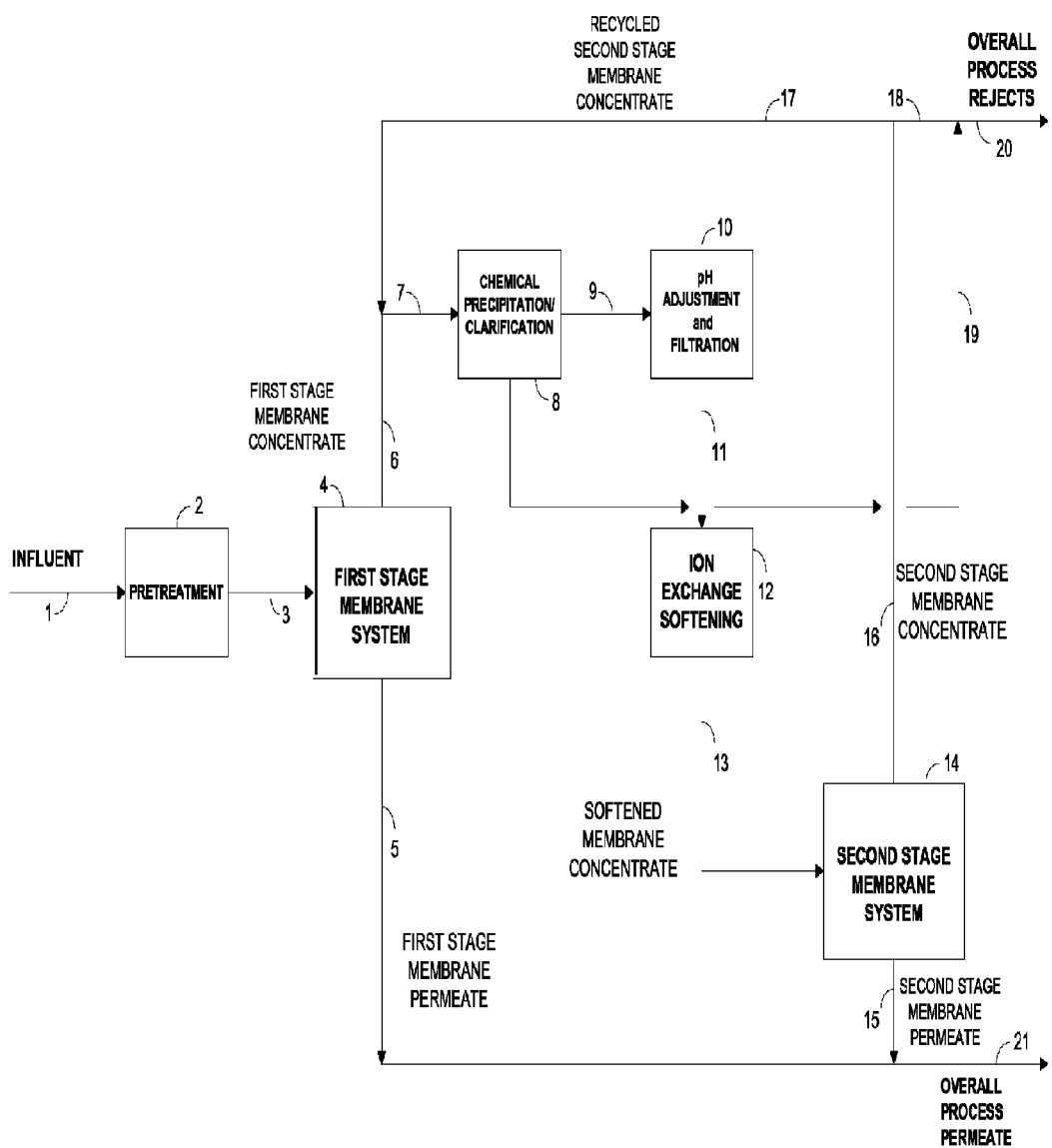
FIG. 1 is a schematic representation of an enhanced high recovery 2-stage membrane process (RO1-CP-IX-RO2) which treats high flowrates of Influent Water containing low Total Dissolved Solids (TDS), moderate to high hardness and low to moderate silica concentrations and recovers 67% to 99.9% of purified water, while eliminating the risk of deposition of hardness, silica and other scale compounds on the membrane surface.

The present invention is intended to address limitations of prior art, including U.S. Pat. Nos. 6,113,797 and 6,461,514B1. U.S. Pat. No. 6,113,797 teaches using a 2-stage membrane process with post $2^{nd}$ stage membrane concentrate softening that achieves very high purified water recoveries in the range 67% to 99.9%. In U.S. Pat. No. 6,113,797, the high TDS $2^{nd}$ stage membrane concentrate containing most of the soluble and sparingly soluble inorganic ions is softened by chemical precipitation at high pH followed by clarification, filtration and pH reduction, and recycling to the low pressure side of the $2^{nd}$ stage membrane system to achieve further recovery of purified water. Alternatively, if the silica concentration is not limiting, the $2^{nd}$ stage membrane concentrate is softened simply by passage through a suitable ion exchange softening resin, followed by recycling to the low pressure side of said $2^{nd}$ stage membrane system to achieve further purified water recovery. U.S. Pat. No. 6,461,514B1 teaches a single stage high recovery membrane process whereby the membrane concentrate containing high hardness but low silica is softened by passage through a suitable ion exchange softening resin followed by recycling to the low pressure side of said single stage membrane system to achieve further purified water recovery.

It has been found that while the chemical precipitation (i.e. CP) softening step taught in U.S. Pat. No. 6,113,797 is capable of removing most of the hardness and silica from the $2^{nd}$ stage membrane concentrate, said CP softening step will leave a significant concentration of residual hardness (i.e. calcium, magnesium) ions and silica due to inefficiencies in the design or in the operation of said CP softening step. These recycled residual sparingly soluble ions, upon blending with the preconcentrated sparingly soluble ions from the first membrane stage, will concentrate further over the $2^{nd}$ stage membranes, thus potentially forming scale compounds which may limit the overall process purified water recovery, especially in cases where the Influent Water's hardness is large. There are a number of remedies to this problem, including: (1) increasing the flowrate of the recycled $2^{nd}$ stage membrane concentrate, (2) adding acid to decrease the pH of the blended feed to the membrane unit and thus further reduce the calcium and magnesium scale potential, and (3) increase the dosage of the anti-scalant chemical added to further reduce the hardness and silica scale potential, or a combination of these different remedial measures. It will be noted, however, that these alternative remedial measures will adversely affect the capital and/or operating cost of the high recovery process.

When ion exchange (IX) softening is applied on its own to the $2^{nd}$ stage membrane concentrate (in U.S. Pat. No. 6,113,797) or is applied to the single stage membrane process concentrate (in U.S. Pat. No. 6,461,514B1) as a simple, low-cost alternative to CP softening, the IX softening step will not be effective in removing silica from the membrane concentrate, thus allowing the silica to further concentrate over the membranes and potentially limit the overall permeate (i.e. purified water) recovery. The addition of anti-scalants will alleviate but not completely eliminate this problem since anti-scalants have an upper silica solubility range of 200-250 mg/L.

Figure 2:
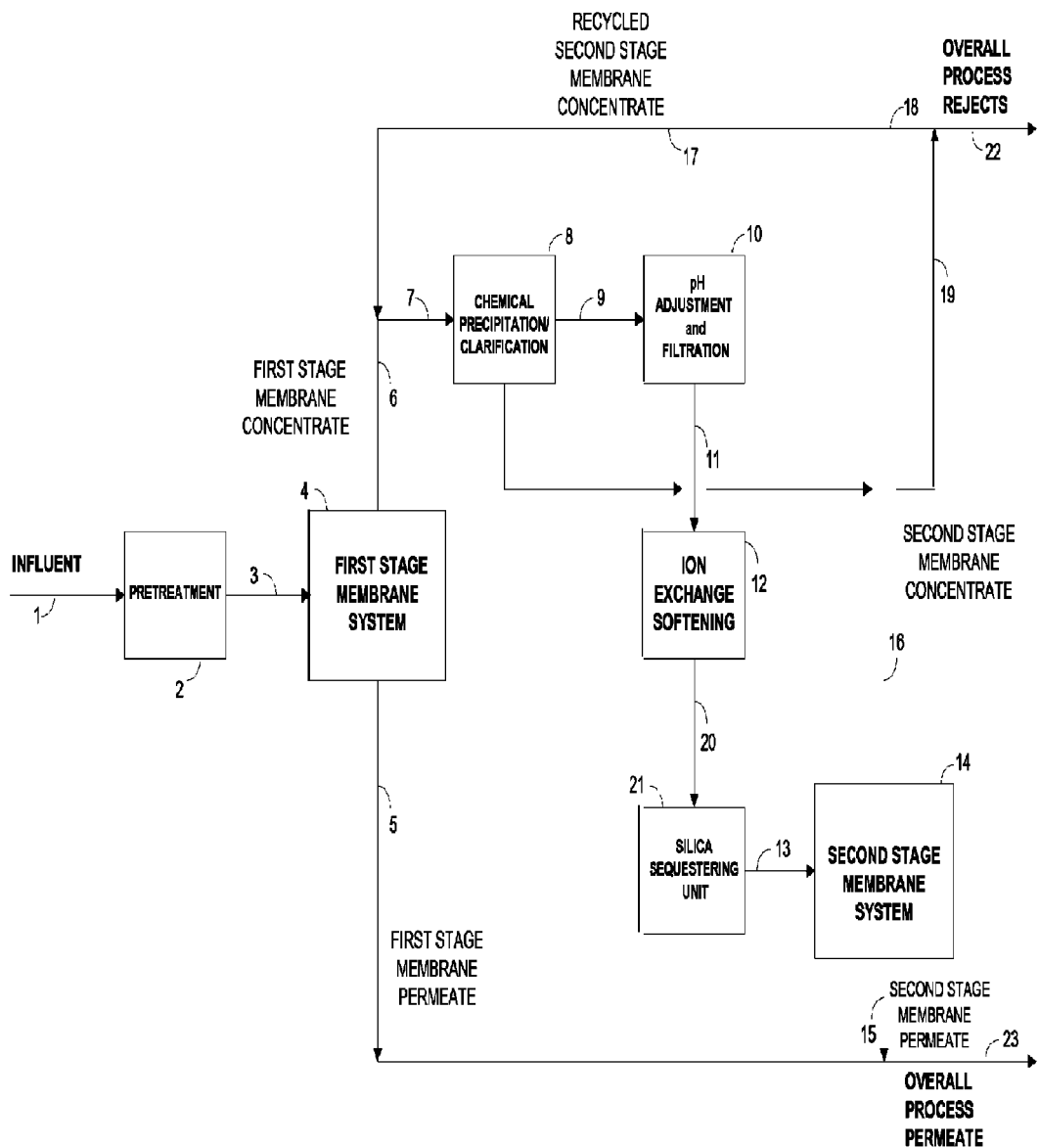
FIG. 2 is a schematic representation of another embodiment of the enhanced high recovery 2-stage membrane process of FIG. 1 (RO1-CP-IX-SSU-RO2) which treats high flow, low TDS, moderate to high hardness and high silica Influent Water and recovers 67% to 99.9% of purified water, while eliminating the risk of deposition of hardness, silica and other scale compounds on the membrane surface.
Figure 3:
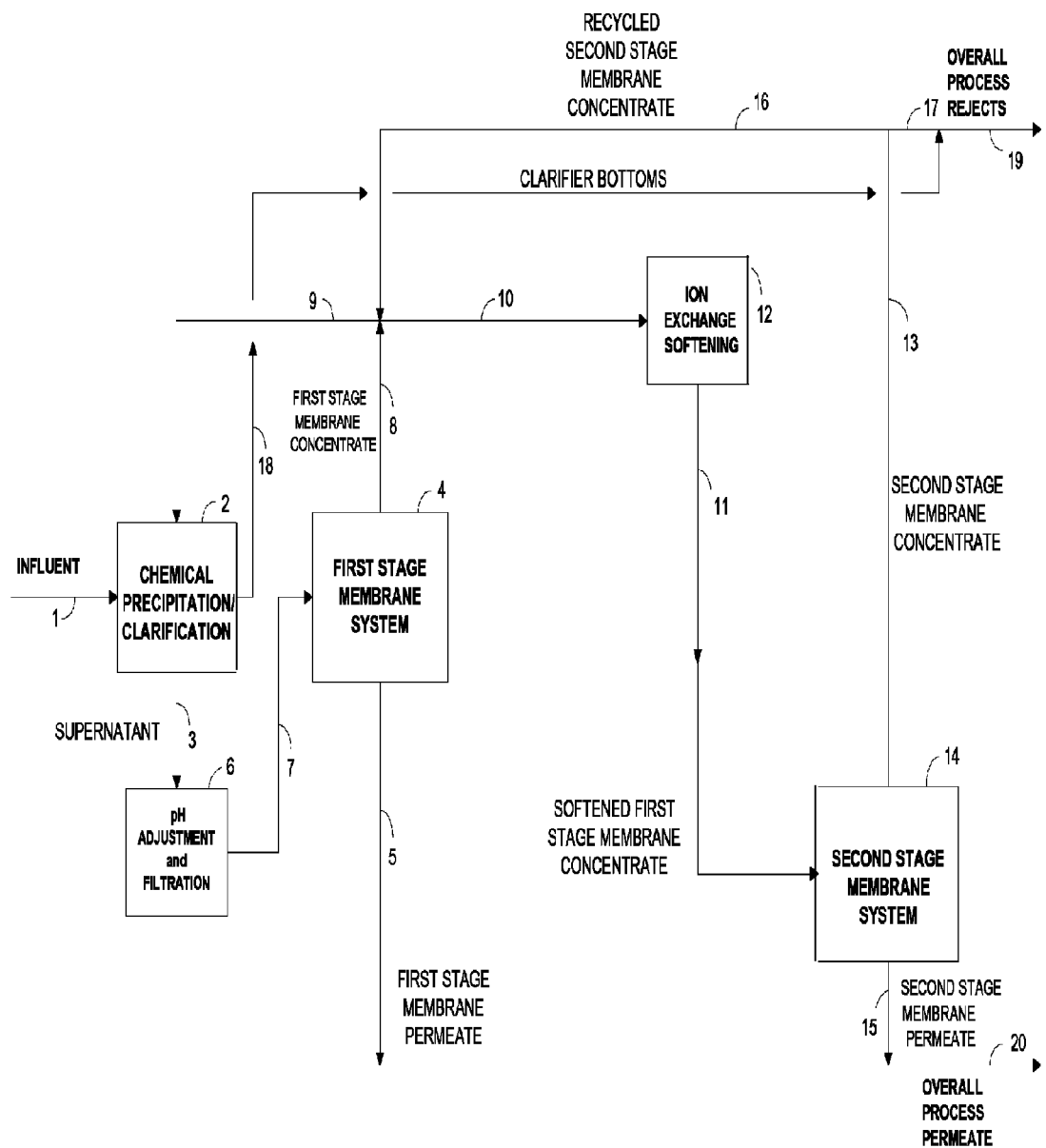
FIG. 3 is a schematic representation of yet another embodiment of the enhanced high recovery 2-stage membrane process of FIG. 1 (CP-RO1-IX-RO2) which treats high flowrates of Influent Water containing low TDS, high to very high hardness and moderate silica concentrations and recovers 67% to 99.9% of purified water, while eliminating the risk of deposition of hardness, silica and other scale compounds on the membrane surface.
Figure 4:
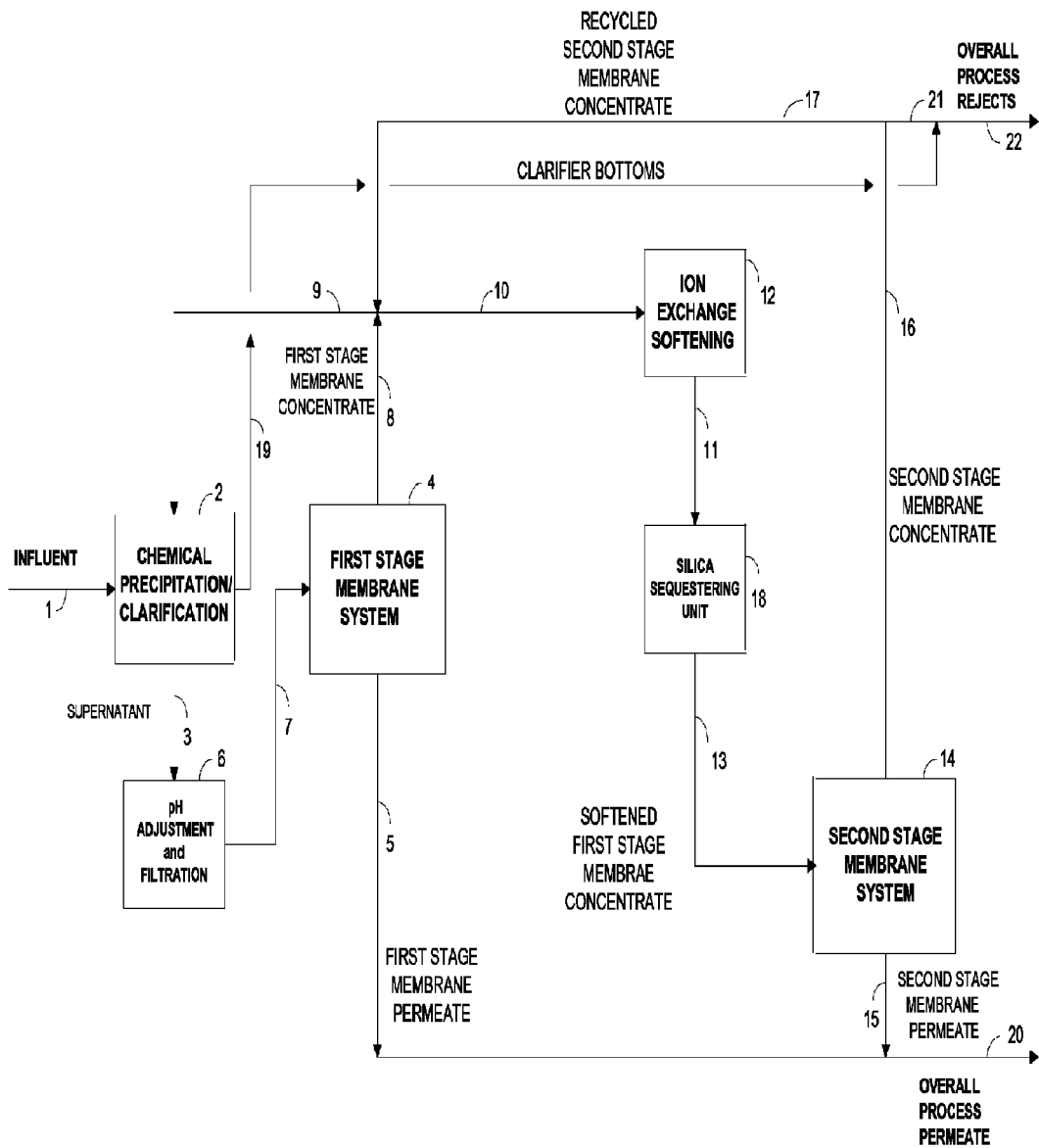
FIG. 4 is a schematic representation of another embodiment of the enhanced high recovery 2-stage membrane process of FIG. 3 (CP-RO1-IX-SSU-RO2) which treats high flowrates of Influent Water containing low TDS, high to very high hardness and high silica concentrations and recovers 67% to 99.9% of purified water, while eliminating the risk of deposition of hardness, silica and other scale compounds and fouling material on the membrane surface.
Figure 5:
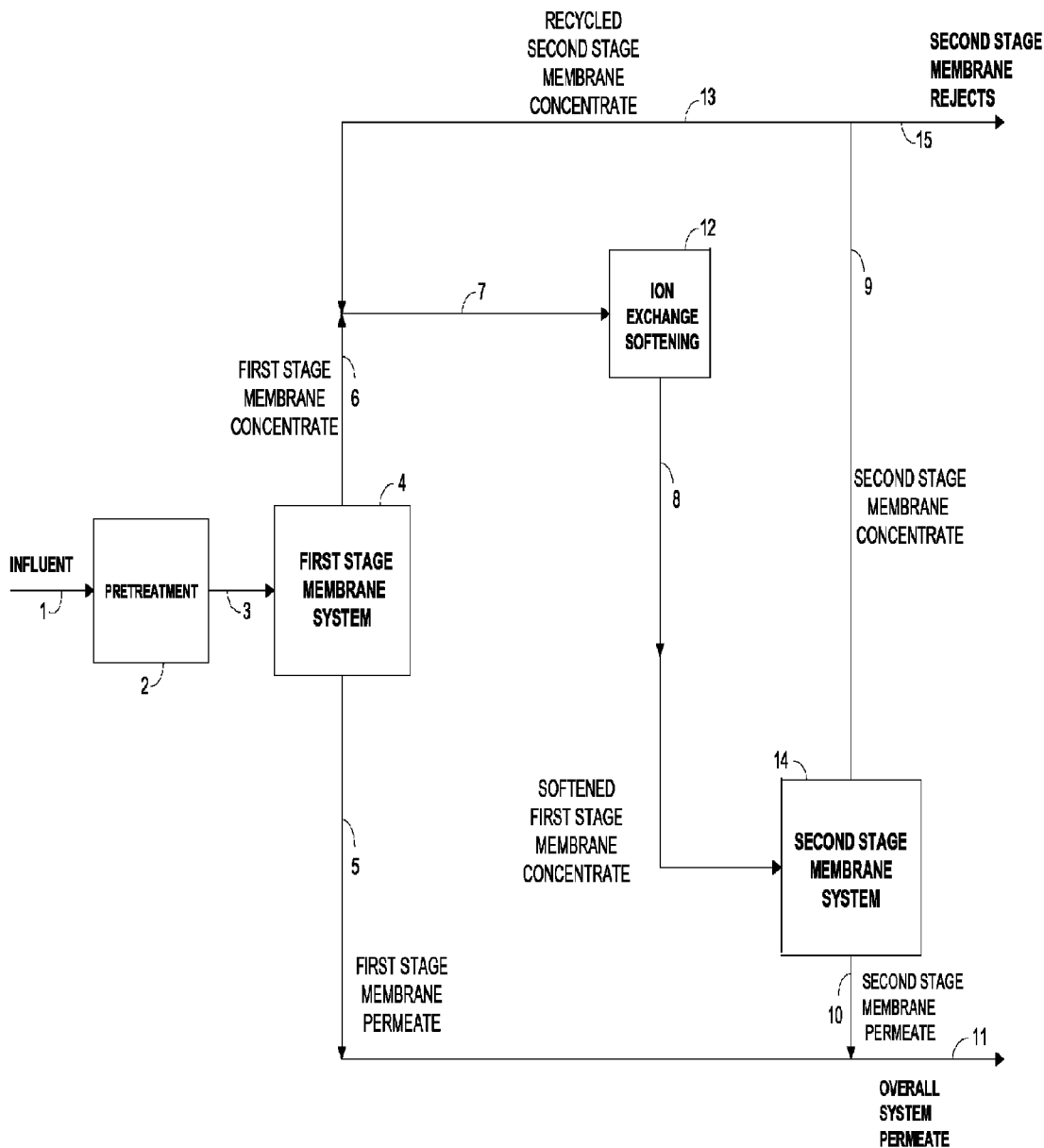
FIG. 5 is a schematic representation of yet another embodiment of the enhanced high recovery 2-stage membrane process of FIG. 1 (RO1-IX-RO2) which treats high flowrates of Influent Water containing low TDS, moderate to high hardness and very low silica concentrations and recovers 67% to 99.9% of purified water, while eliminating the risk of deposition of hardness, silica and other scale compounds on the membrane surface.
Figure 6:
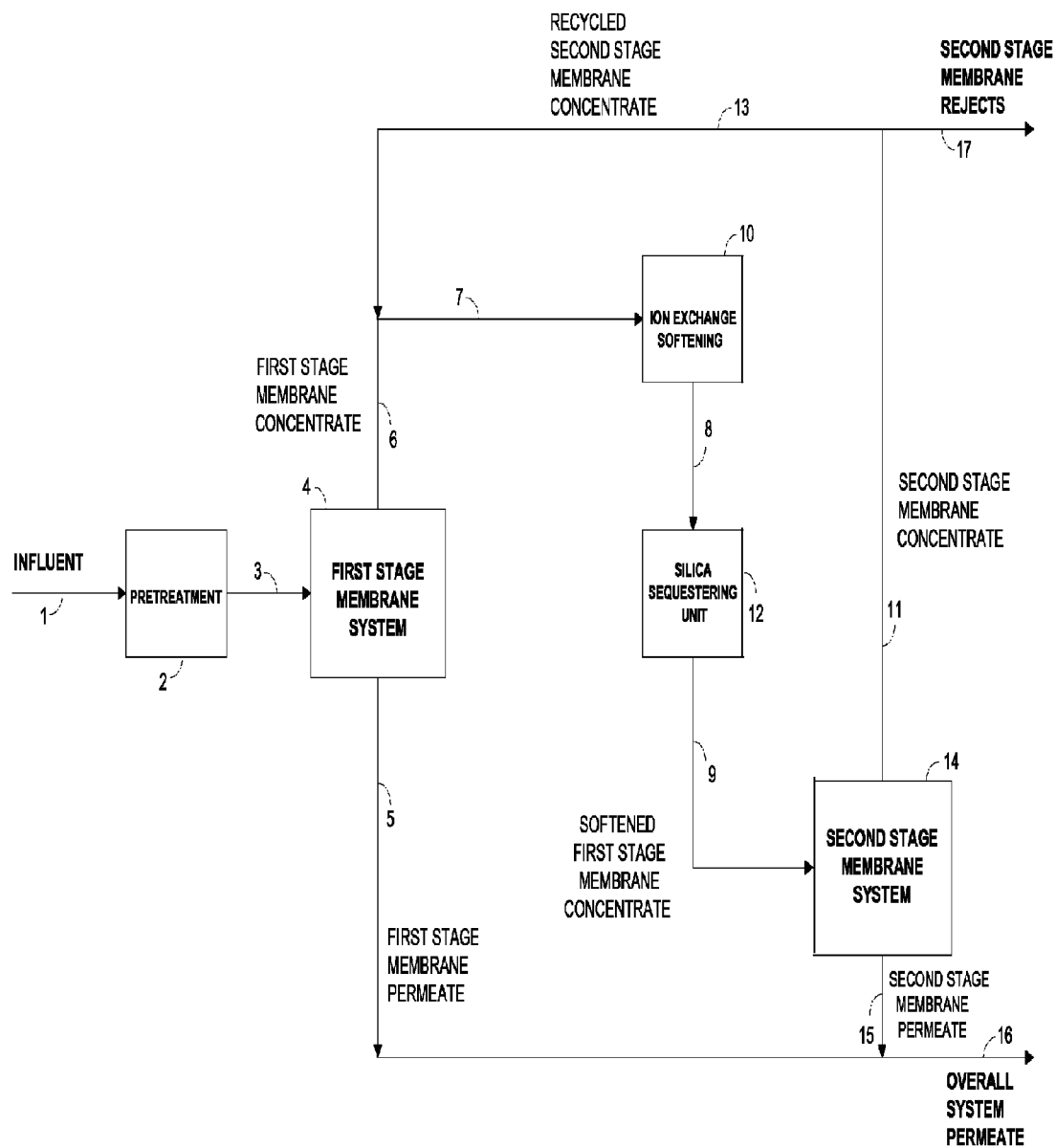
FIG. 6 is a schematic representation of yet another embodiment of the enhanced high recovery 2-stage membrane process of FIG. 1 (RO1-IX-SSU-RO2) which treats high flow Influent Water containing low TDS, moderate hardness and low to moderate silica and recovers 67% to 99.9% of purified water, while eliminating the risk of deposition of hardness, silica and other scale compounds on the membrane surface.
Figure 7:
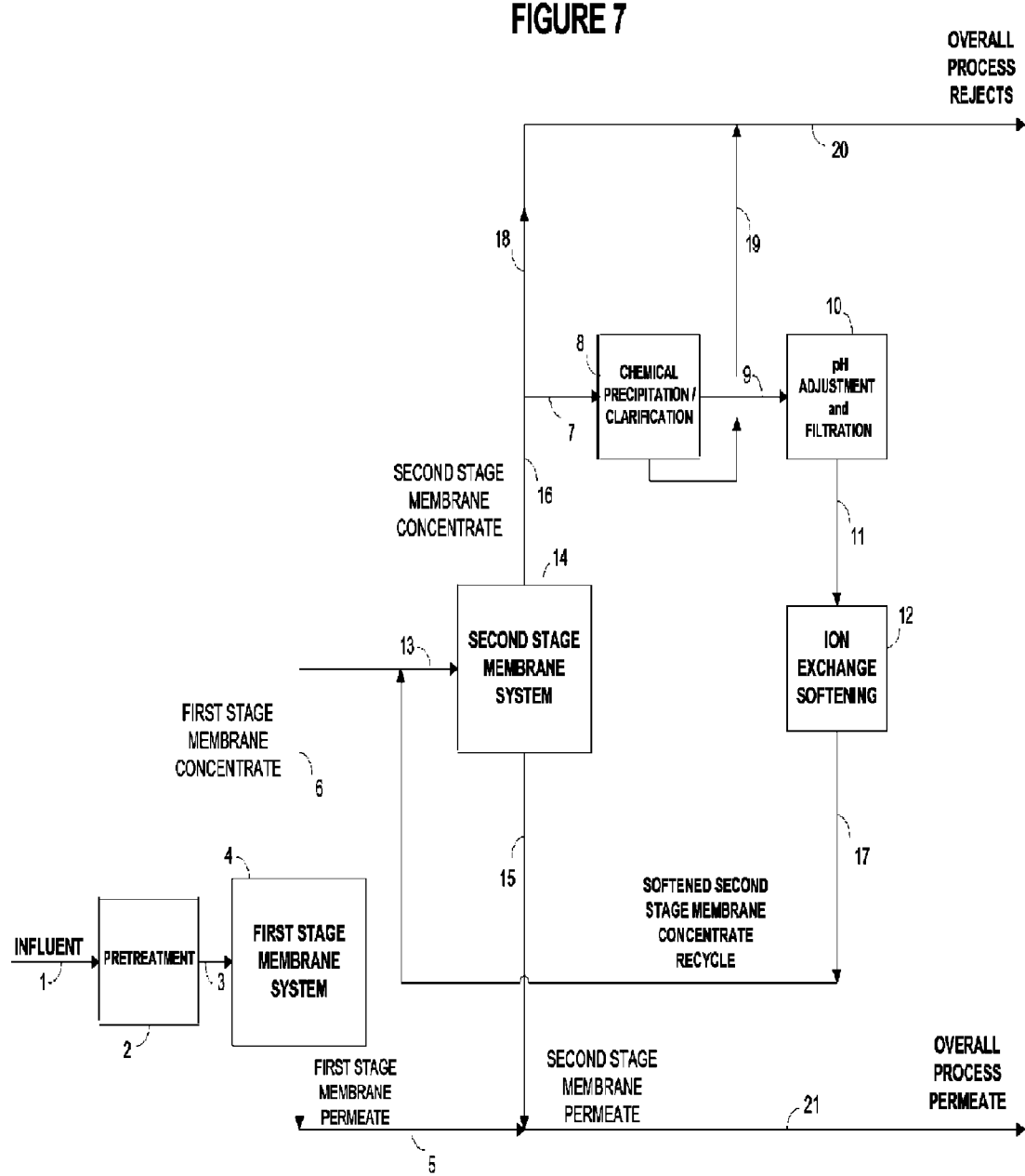
FIG. 7 is a schematic representation of another enhanced high recovery 2-stage membrane process (RO1- RO2-CP-IX) which treats high flowrates of Influent Water containing low TDS, low to moderate hardness and low silica concentrations and recovers 67% to 99.9% of purified water, while eliminating the risk of deposition of hardness and silica on the membrane surface.
Figure 8:
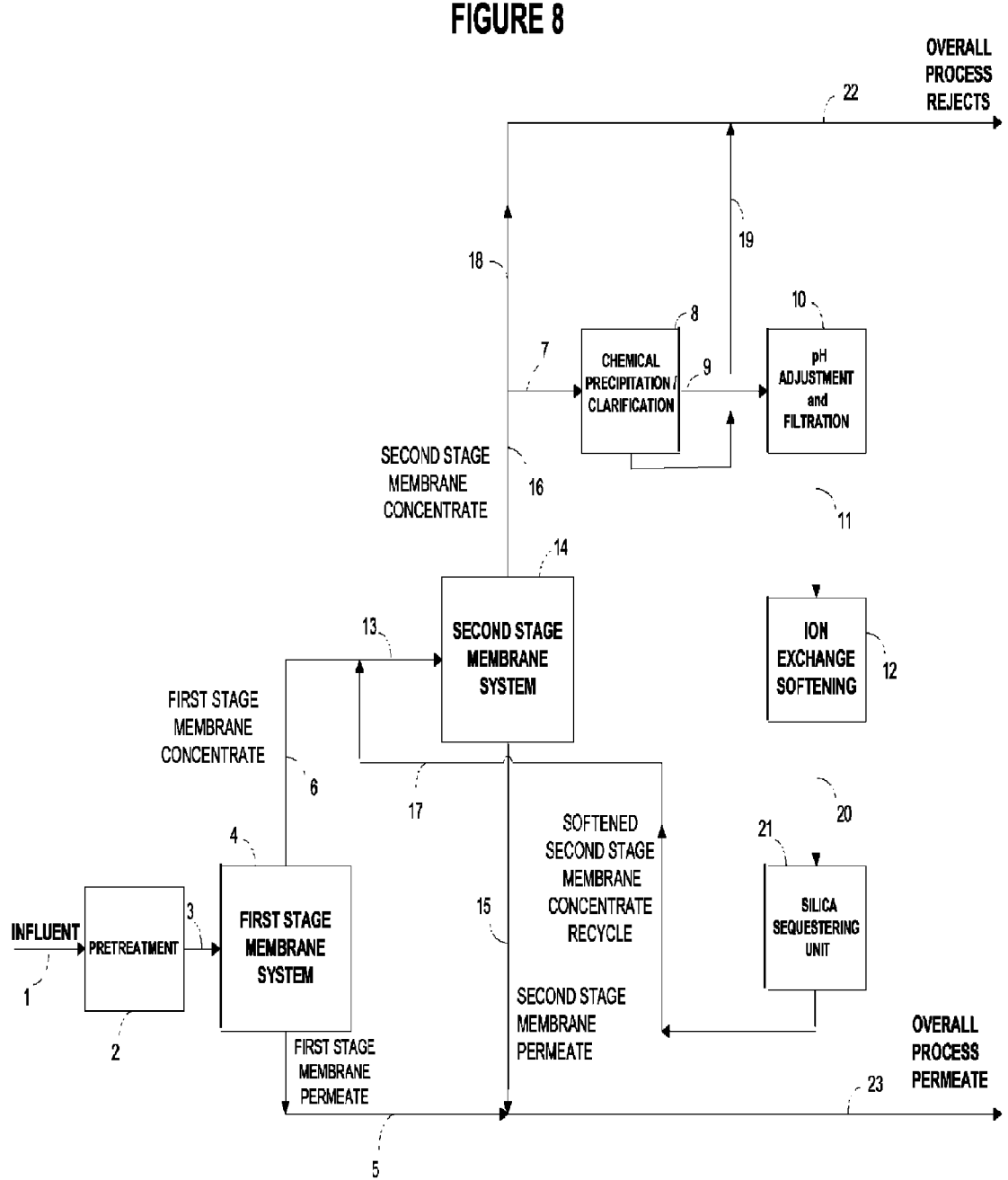
FIG. 8 is a schematic representation of another embodiment of the enhanced 2-stage high recovery membrane process of FIG. 7 (RO1- RO2-CP-IX-SSU) with post $2^{nd}$ stage membrane concentrate softening and recycling of the softened concentrate, which treats high flowrate Influent Water with low TDS, low to moderate hardness and low to moderate silica and recovers 67% to 99.9% of purified water, while eliminating the risk of deposition of hardness and silica on the membrane surface.
Figure 9:
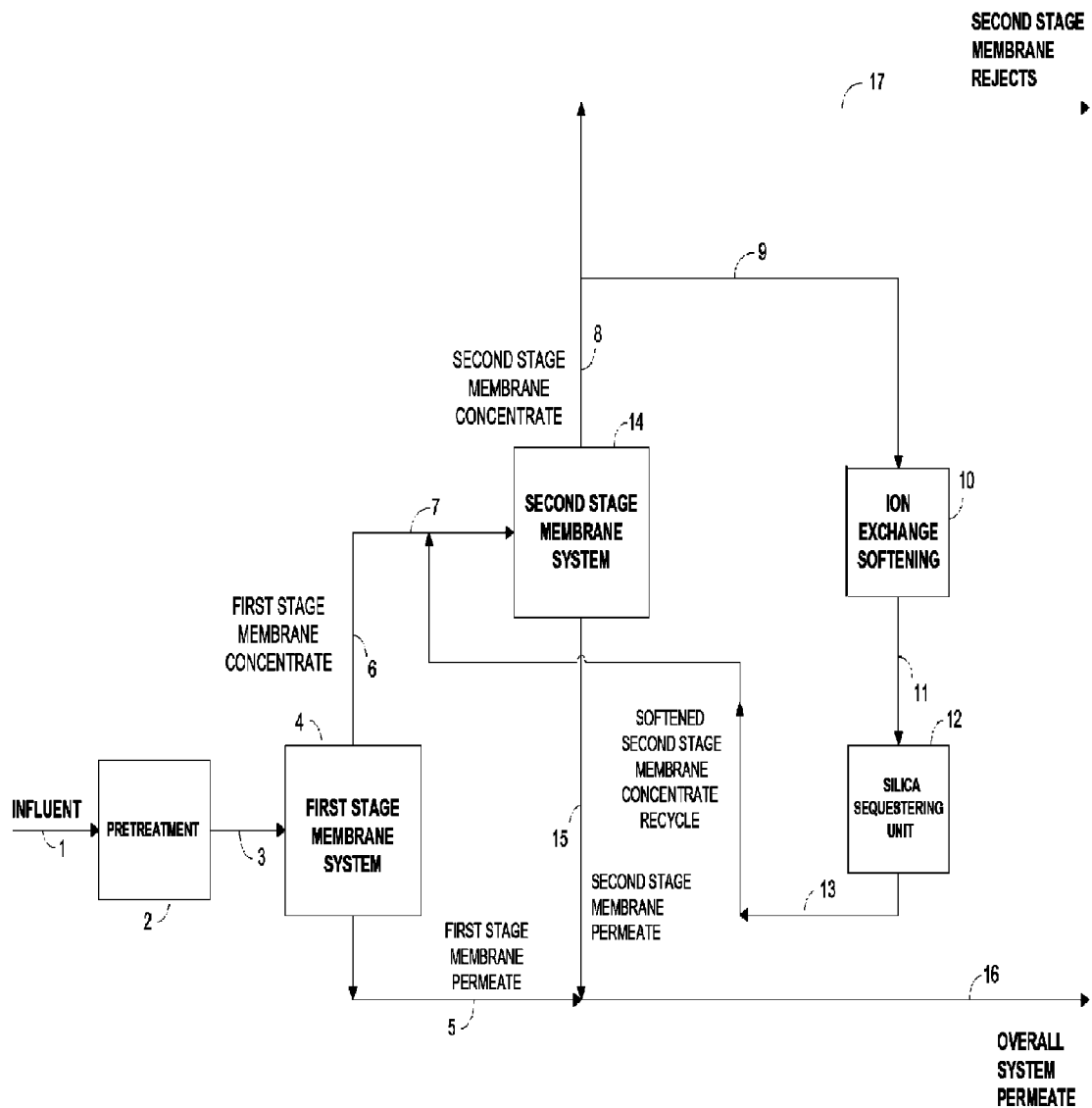
FIG. 9 is a schematic representation of yet another embodiment of the enhanced high recovery 2-stage membrane process depicted in FIG. 8 (RO1- RO2-IX-SSU), which treats high flow Influent Water containing low TDS, low hardness and low to moderate silica and recovers 67% to 99.9% of purified water, while eliminating the risk of deposition of hardness, silica and other scale compounds on the membrane surface.
Figure 10:
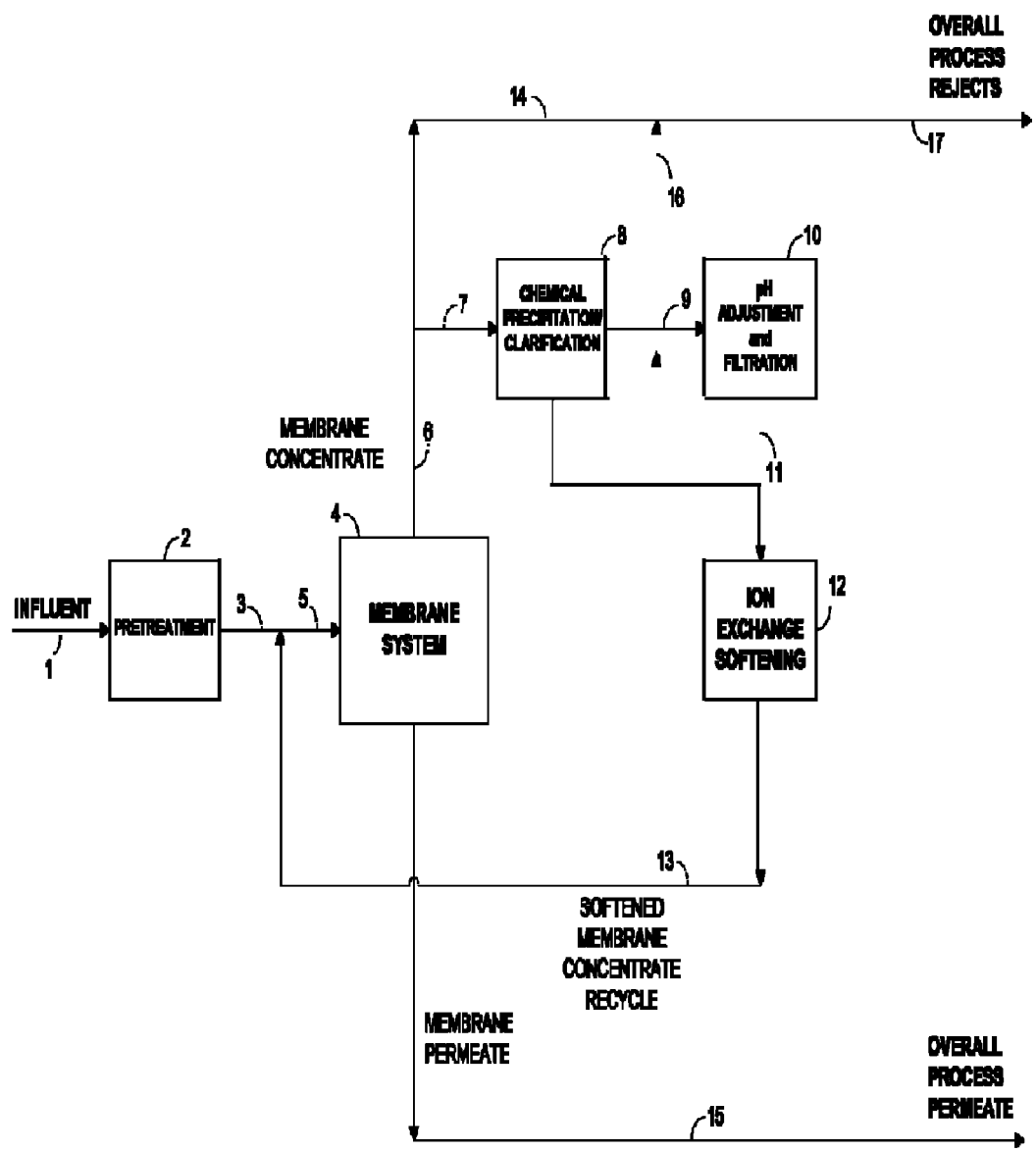
FIG. 10 is a schematic representation of another enhanced high recovery single stage membrane process (RO-CP-IX) which treats low flow Influent Water or Influent Water containing a moderate concentration of TDS, low to moderate hardness and low to moderate silica concentrations and recovers 67% to 99.9% of purified water, while eliminating the risk of deposition of hardness, silica and other scale compounds on the membrane surface.
Figure 11:
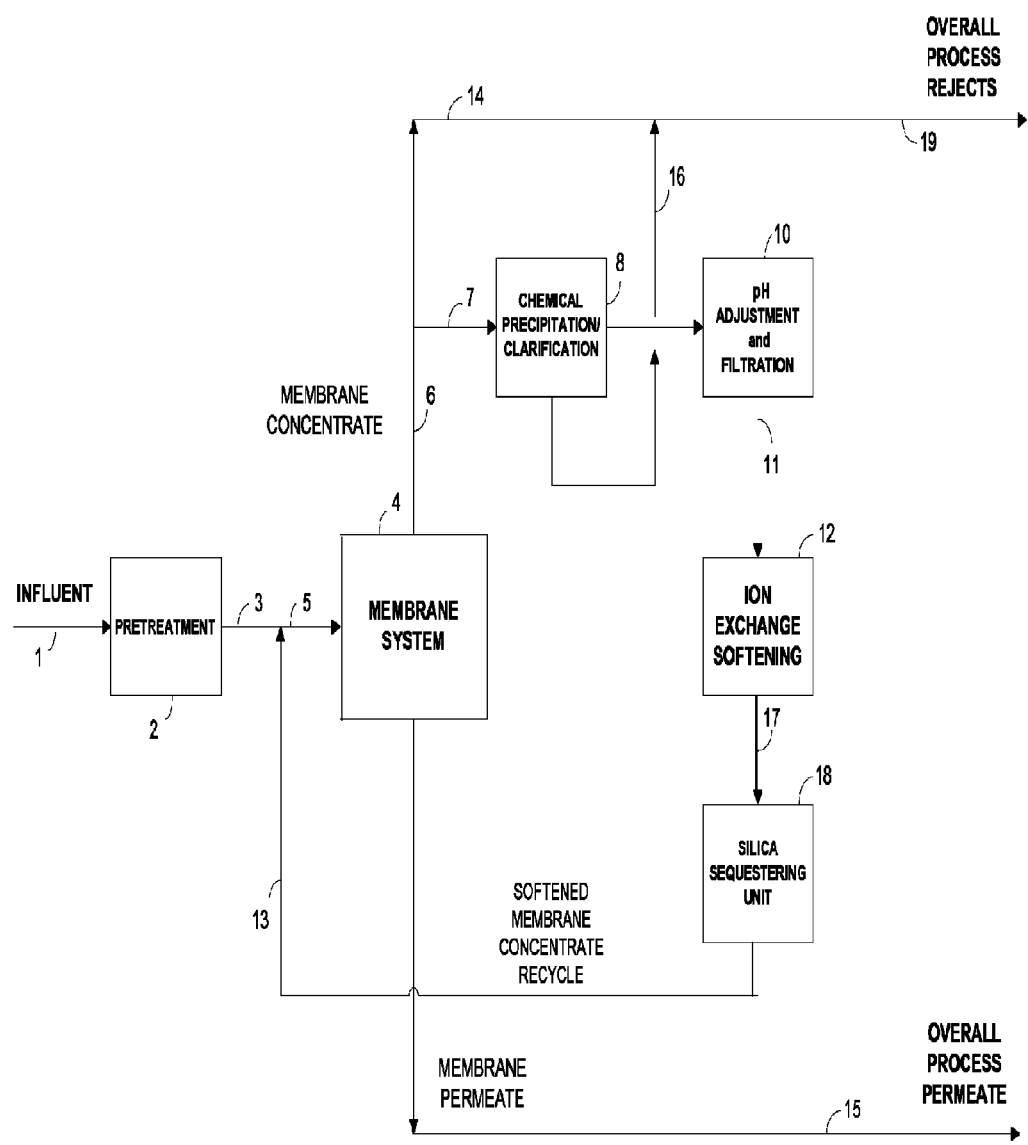
FIG. 11 is a schematic representation of another embodiment of the enhanced high recovery single stage membrane process of FIG. 10 (RO-CP-IX-SSU) which treats low flow Influent Water containing a moderate concentration of total dissolved solids (TDS), low to moderate hardness and moderate to high silica concentrations, and recovers 67% to 99.9% of purified water, while eliminating the risk of deposition of hardness, silica and other scale compounds on the membrane surface.
Figure 12:
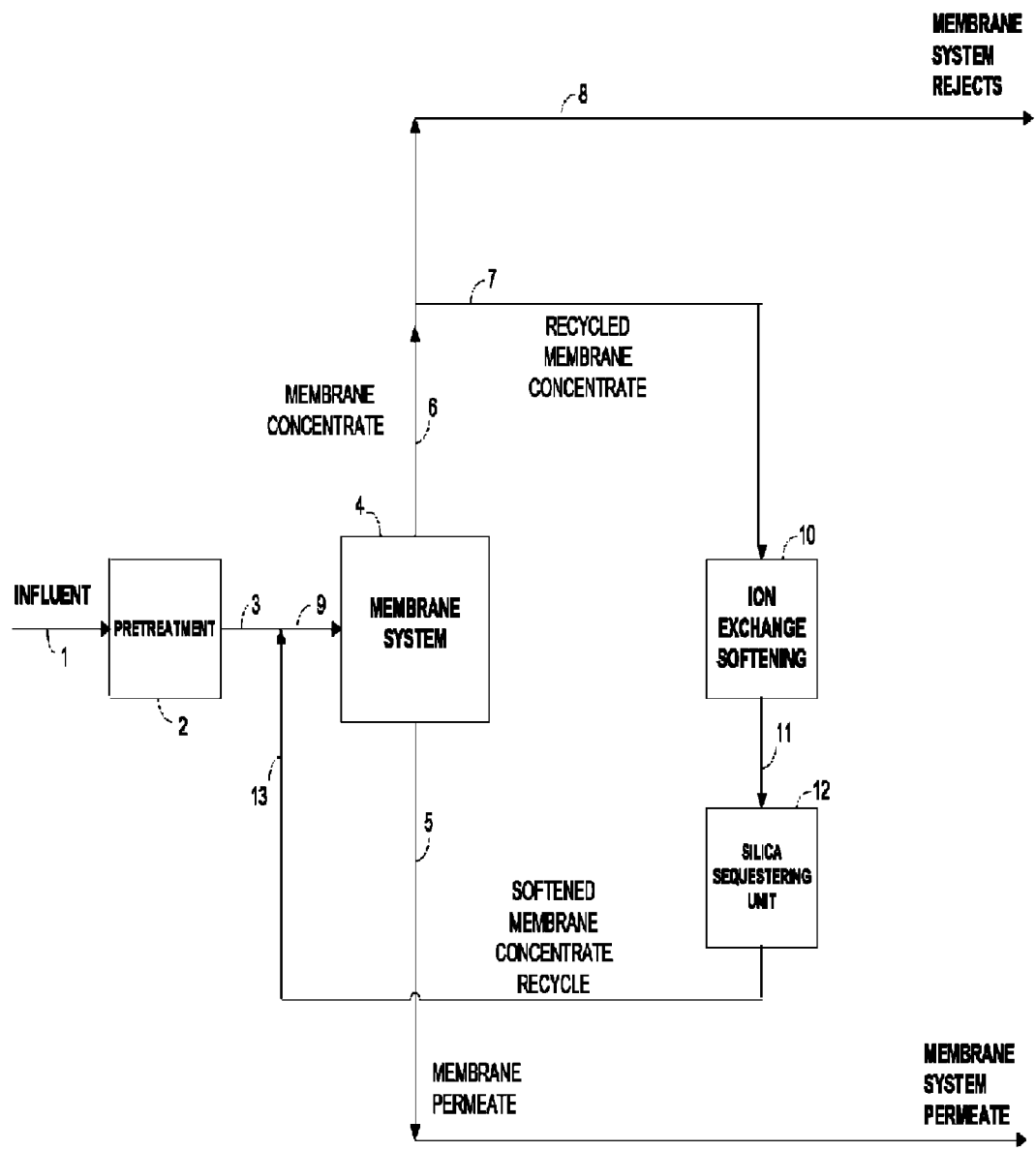
FIG. 12 is a schematic representation of yet another embodiment of the enhanced high recovery single stage membrane process depicted in FIG. 10 (RO-IX-SSU), which treats low flow Influent Water containing high TDS, low hardness and low silica and recovers 67% to 99.9% of purified water, while eliminating the risk of deposition of hardness, silica and other scale compounds on the surface of membrane unit.
Figure 13:
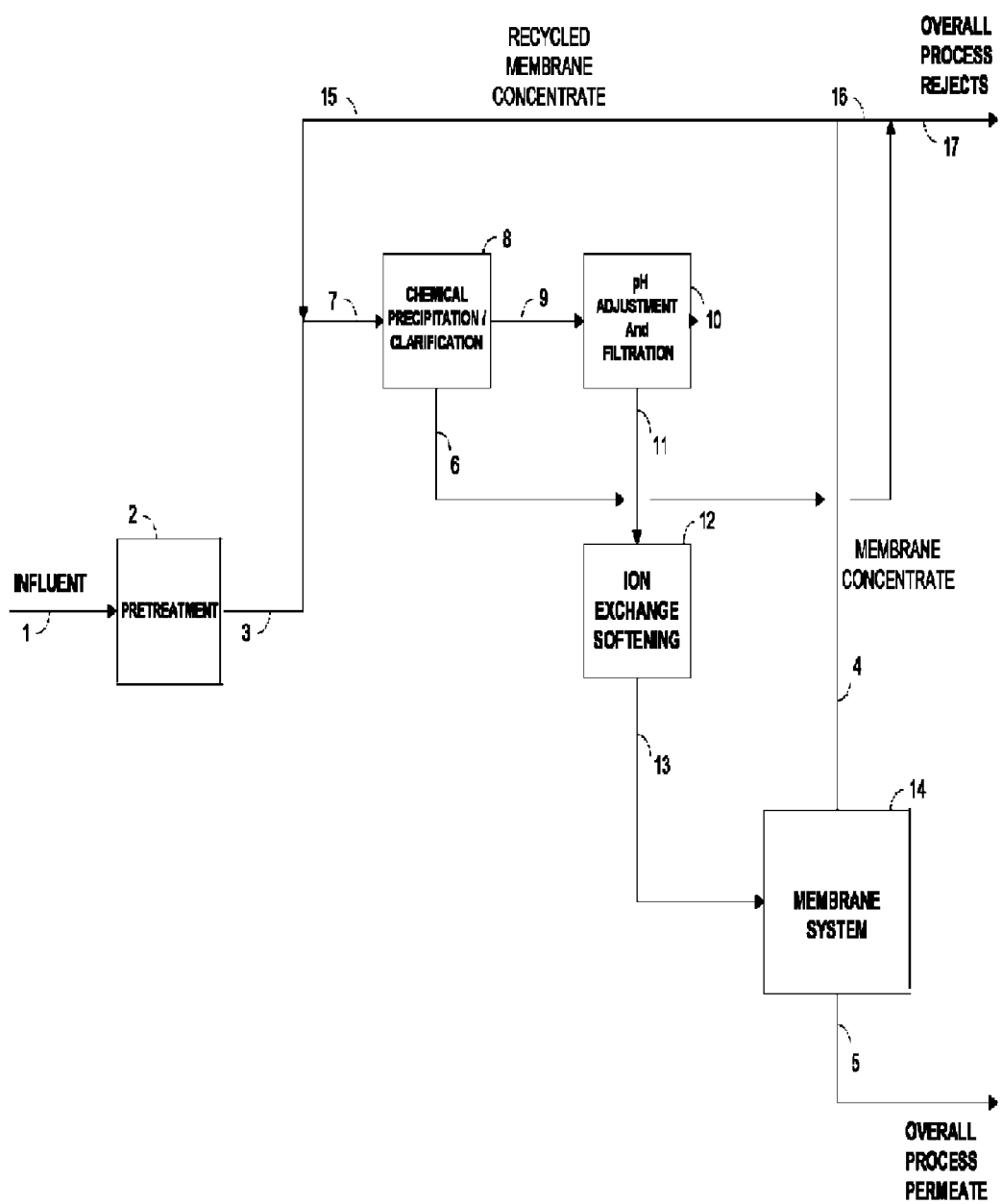
FIG. 13 is a schematic representation of yet another enhanced high recovery single stage membrane process (CP-IX-RO) which treats low flow Influent Water or Influent Water containing a moderate concentration of total dissolved solids (TDS), high to very high hardness and low to moderate silica concentrations and recovers 67% to 99.9% of purified water, while eliminating the risk of deposition of hardness, silica and other scale compounds on the membrane surface.
Figure 14:
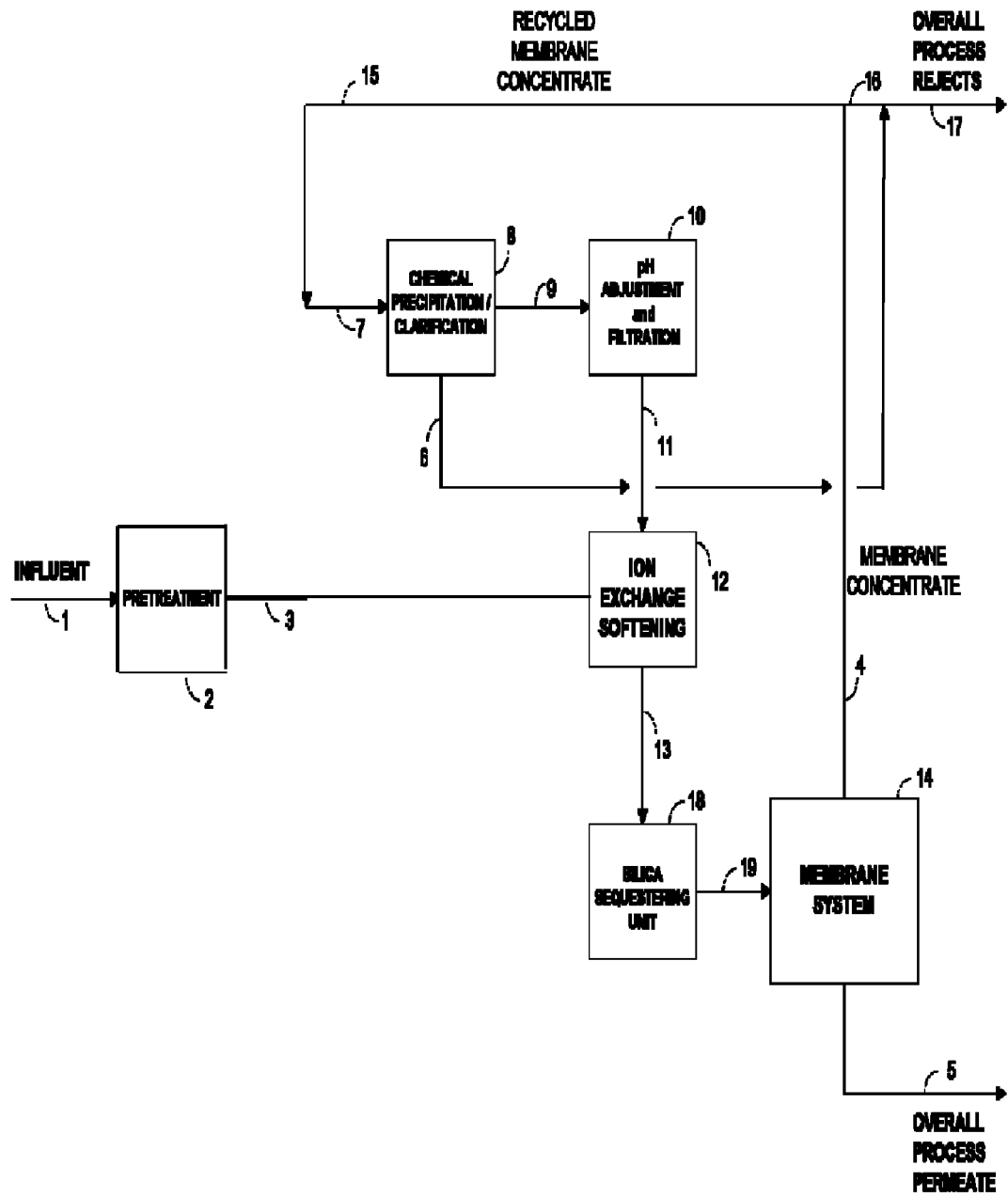
FIG. 14 is a schematic representation of another embodiment of the enhanced high recovery single stage membrane process of FIG. 13 (CP-IX-SSU-RO) which treats low flow Influent Water containing a moderate concentration of TDS, high to very high hardness and high silica concentrations, and recovers 67% to 99.9% of purified water, while eliminating the risk of deposition of hardness, silica and other scale compounds on the membrane surface.
Figure 15:
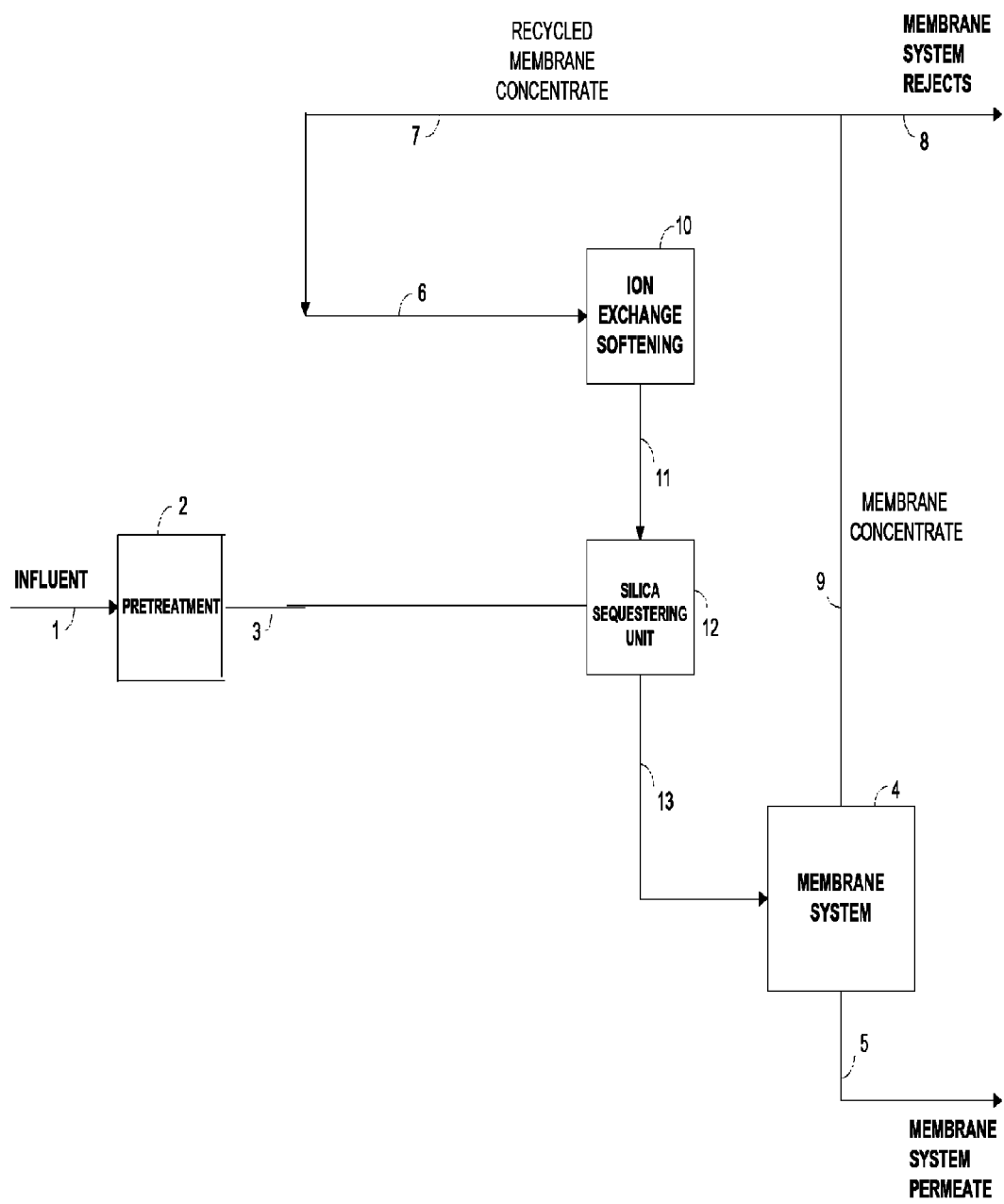
FIG. 15 is a schematic representation of yet another embodiment of the enhanced high recovery single stage membrane process depicted in FIG. 14 (IX-SSU-RO), which treats low flow Influent Water containing high TDS, moderate hardness and low to moderate silica and recovers 67% to 99.9% of purified water, while eliminating the risk of deposition of hardness, silica and other scale compounds on the surface of membrane unit.

The present patent disclosures are intended to address the above-described limitations of prior art, including U.S. Pat. Nos. 6,113,797 and 6,461,514B1 and enable high purified water recoveries in the range 67% to 99.9% to be achieved in an economical manner irrespective of the concentration of hardness and silica in the Influent Water. Furthermore, the purified water recovery in the present invention will not be adversely affected by design and/or operational deficiencies in the CP softening system that may result in higher residual hardness and silica in the supernatant from the CP step. A total of 15 high recovery process configurations will be disclosed in order to treat Influent Water with different characteristics, in particular depending on the Influent Water's flowrate, total dissolved solids (TDS), total hardness ions and silica concentrations. These process configurations are listed below:

RO1-CP-IX-RO2, as depicted in FIG. 1
RO1-CP-IX-SSU-RO2, as depicted FIG. 2
RO1-IX-SSU-RO2, as depicted FIG. 6
RO1-IX-RO2, as depicted in FIG. 5
CP-RO1-IX-RO2, as depicted in FIG. 3
CP-RO1-IX-SSU-RO2, as depicted in FIG. 4
RO1-RO2-CP-IX, as depicted FIG. 7
RO1-RO2-CP-IX-SSU, as depicted FIG. 8
RO1-RO2-IX-SSU, as depicted FIG. 9
RO-CP-IX, as depicted FIG. 10
RO-CP-IX-SSU, as depicted FIG. 11
RO-IX-SSU, as depicted FIG. 12
CP-IX-RO, as depicted FIG. 13
CP-IX-SSU-RO, as depicted FIG. 14
IX-SSU-RO, as depicted FIG. 15

The acronyms used in the above process configurations are explained below:

RO1 is first stage reverse osmosis membrane system in a 2-stage high recovery membrane process
RO2 is second stage reverse osmosis membrane system in a 2-stage high recovery membrane process
RO is the reverse osmosis membrane system in a single stage high recovery membrane process
CP denote chemical precipitation softening to remove bulk hardness and silica
IX denotes ion exchange softening to completely remove hardness
SSU denotes a single or multiple column silica sequestering unit to efficiently and selectively remove silica.

The best mode of the invention is the RO1-CP-IX-RO2 high recovery process configuration represented schematically in FIG. 1. This mode represents enhanced high recovery 2-stage membrane process which treats high flowrates of Influent Water 1, e.g. >100 US gallons per minute, containing low to moderate concentrations of total dissolved solids (TDS), e.g. 200-4000 mg/L, moderate to high hardness (e.g. 150-300 mg/L as calcium carbonate $CaCO_3$) and low to moderate silica (e.g. 5-40 mg/L) and produces a good quality low-TDS purified water stream 21 and a small volume of high-TDS reject stream 20, while preventing the precipitation of hardness and silica compounds on the surface of the membranes.

As shown in FIG. 1, the Influent Water 1 is first pretreated in 2 to remove suspended solids, colloidal matter, oil if present, and other soluble organic and inorganic fouling material by using a suitable pretreatment means including aeration and/or chemical oxidation to oxidize and precipitate iron and manganese if present, biological treatment to remove soluble organic compounds and prevent biological fouling if the chemical oxygen demand (COD) and biological oxygen demand ($BOD_5$) are significant, coagulation, flocculation, clarification, multi-media filtration, ultrafiltration or microfiltration of the suspended solids, chemically or biologically precipitated solids followed by chemical conditioning of the suspended solids' free water, including the addition of acid and anti-scalant to further reduce the scale potential of the pretreated water 3. The pretreated water 3 is then introduced into the first stage reverse osmosis (RO) or nanofiltration (NF) membrane system 4, operating at 200-300 psig and up to 600 psig, which purifies a large fraction (i.e. 50% to 75% and up to 85%) of the Influent Water 1, producing a first stage membrane permeate 5 and a smaller first stage membrane concentrate 6 which is normally 20%-30% of the Influent Water flowrate. The first stage membrane concentrate 6 with TDS in the normal range of 1,000-4000 mg/L and up to 10,000 mg/L is blended with recycled high-TDS second stage membrane concentrate 17 to produce a combined membrane concentrate 7 which contains elevated concentrations of TDS (in the range 10,000-20,000 mg/L), elevated hardness and silica. Said combined membrane concentrate 7 is treated in the Chemical Precipitation and Clarification unit 8 by the addition of alkali solutions including sodium hydroxide, sodium carbonate, calcium hydroxide and magnesium hydroxide to raise the pH to the range 10-11, chemically precipitate di-valent and tri-valent hardness compounds including calcium, magnesium, iron, manganese and silica and produce a softened and clarified combined membrane concentrate (i.e. clarifier supernatant) 9 that is low in hardness, silica and other chemical and biological fouling compounds. The chemically softened combined membrane concentrate 9 is filtered in 10 by using a suitable, effective filtration means to remove residual, entrained suspended solids and the pH adjusted to the range 6-8 by the addition of a suitable mineral acid to further reduce said combined concentrate stream's temporary hardness and produce a chemically softened, clarified and filtered combined membrane concentrate 11. As shown in FIG. 1, the said chemically softened, clarified and filtered combined membrane concentrate 11 is further softened in ion exchange softening unit 12 where the residual hardness ions including barium, calcium and magnesium and residual heavy metals including aluminum, iron and manganese are separated efficiently., producing completely softened combined membrane concentrate 13. Said completely softened combined membrane concentrate 13 is introduced into the high pressure second stage RO or NF membrane system 17, normally operating at up to 1100 psig and possibly up to 2000 or even 3000 psig to produce additional, purified second stage membrane permeate 15 and a high-TDS second stage membrane concentrate 16 with a TDS normally in the range 20,000-40,000 mg/L and up to 80,000 to 100,000 mg/L. The purified second stage membrane permeate 15 is combined with the first stage membrane permeate 5 to produce a combined purified membrane process permeate 21 which is equivalent to 67% to 99.9% of the flowrate of the Influent Water 1. A large fraction of the second stage membrane concentrate 17 is recycled and combined with the first stage membrane concentrate 6 to achieve further softening and water recovery as described earlier. A small stream of high TDS second stage membrane concentrate 18 is combined with clarifier slurry rejects 19 and discharged as a small process reject stream 20 to limit the osmotic pressure. The second stage membrane permeate 15 is combined with the first stage membrane permeate 5 and removed as final recovered product 21.

The other embodiments of the invention have been described earlier and are represented in FIGS. 2-15, respectively. As described earlier, these embodiments are intended to address variable Influent Water flowrates, TDS, hardness and silica concentrations, thus ensuring effectiveness of separation of hardness and silica compounds while minimizing the capital and operating costs.

For example, when the Influent Water flowrate is small, e.g. <100 U.S. gpm, and/or when the Influent Water TDS is high (e.g. in the range 5,000-10,000 mg/L), a single stage enhanced high recovery membrane process is used, as illustrated in the embodiments of FIGS. 10, 13, 11, 14, 12 and 15. In these cases, the single stage membrane process will operate at high pressure of 500-1100 psig and up to 3000 psig. When the Influent Water flowrate is higher (i.e. >100 gpm) and when the TDS is low (i.e. <5000 mg/L), two-stage enhanced high recovery membrane processes are used in order to extract most of the purified water (i.e. permeate) at the low pressure of the first stage membrane system, thus saving energy and reducing the membrane costs. The first stage membrane system can operate at up to 600 psig, while the second stage, processing much smaller flowrates, are operated at up to 1100 psig and possibly up to 3000 psig.

The enhanced high recovery process configuration, i.e. the relative location of the chemical precipitation unit (CP), the ion exchange softening unit (IX) and the silica sequestering unit (SSU) is dictated by the relative concentrations of hardness ions, especially calcium, magnesium and barium, heavy metal foulants, including iron, manganese and aluminum and by the concentration of silica relative to the hardness. For example, when the concentration of hardness and silica are both relatively low, the single stage RO-CP-IX configuration (FIG. 10) and 2-stage RO1-RO2-CP-IX (FIG. 7), RO1-RO2-CP-IX-SSU (FIG. 8) and RO1-RO2-IX-SSU (FIG. 9) configurations may be used. This is feasible since it is possible to preconcentrate hardness and silica compounds to a reasonable extent over RO1 and RO2 membrane systems without scale formation by acidification and anti-sealant dosing of the Influent, followed by removal of said preconcentrated hardness and silica compounds from the concentrate of the second stage membranes and recycling of said softened high TDS membrane concentrate to the low pressure side of said second stage membranes, to enable further purified water recoveries.

While prior art, U.S. Pat. No. 6,113,797 teaches a high recovery 2-stage process that includes RO1-RO2-CP configuration and RO1-RO2-IX configuration, and prior art U.S. Pat. No. 6,461,514 teaches a single stage high recovery process with a simple RO-IX configuration, it can be seen that the recycled, softened membrane concentrate may contain significant concentrations of the residual hardness, silica and other fouling compounds. Said residual hardness, silica and other fouling compounds may interfere with the efficient operation of the single stage membranes or the second stage membranes of the 2-stage process, potentially causing premature fouling and scale formation and requiring higher softened concentrate recycle flowrates and higher costs. By adding IX, IX-SSU to the RO1-RO2-CP process configuration and adding CP and SSU to the RO-IX configuration in the prior art, the fouling potential and scale formation potential over the second stage or single stage membranes, respectively, are substantially reduced in the present invention.

When the hardness and silica concentrations in the Influent are moderate to high, the 2-stage RO1-CP-IX-RO2 configuration described earlier (FIG. 1), the 2-stage RO1-CP-IX-SSU-RO2 configuration (FIG. 2) and the 2-stage RO1-IX-SSU-RO2 configuration (FIG. 6), as well as the 1-stage CP-IX-RO configuration (FIG. 13), 1-stage CP-IX-SSU-RO configuration (FIG. 14) and the 1-stage IX-SSU-RO configuration (FIG. 15) are utilized. The choice of the softening protocol, i.e. CP-IX, CP-IX-SSU or IX-SSU is dictated by the extent of hardness concentration, the extent of silica concentration and their relative magnitudes in the Influent Water, with the CP-IX-SSU train providing the highest removal of both hardness and silica, thus corresponding to Influent Water with high hardness and high silica concentrations. When the concentration of hardness and silica in the Influent Water is high to very high, the CP-RO1-IX-RO2 configuration (FIG. 3) and CP-RO1-IX-SSU-RO2 configuration (FIG. 4) are used, respectively as described earlier. When the silica concentration in the Influent Water is very low, the RO1-IX-RO2 configuration (FIG. 5) is recommended.

What is claimed is:

1. An improved enhanced two-stage high recovery membrane process for the economical operation of semi-permeable reverse osmosis (RO) membranes which are used to purify water containing soluble and elevated concentrations of sparingly soluble inorganic compounds and achieve recoveries of purified water in the range 67%-99.9% of the Influent Water without precipitation of sparingly soluble inorganic scale compounds on the surface of the membrane, comprising:
  a) blending of the Influent Water, containing soluble and elevated levels of sparingly soluble inorganic compounds with first stage RO1 membrane concentrate recycle stream to provide a blended Influent Water with elevated levels of sparingly soluble inorganic compounds;
  b) introducing said blended Influent Water into a well-mixed chemical precipitation tank wherein the pH is raised by adding an alkaline solution to provide a precipitate of the insoluble inorganic compounds;
  c) removing the well-mixed suspension containing chemically-precipitated inorganic compounds from the chemical precipitation tank;
  d) introducing the well-mixed suspension containing chemically-precipitated inorganic compounds into a clarifier to produce a supernatant solution at the top of the tank which is substantially (but not completely) free from suspended solids and a slurry phase at the bottom containing most of the suspended solids;
  e) removing the bulk solids from the bottom of the clarifier as a slurry reject stream containing Total Dissolved Solids (TDS) in the range 1%-5% and Total Suspended Solids (TSS) in the range 2%-5%;
  f) removing the supernatant from the top of the clarifier, containing TDS in the range 1%-5% and TSS in the range 50 -250 mg/L;
  g) reducing the pH of the supernatant removed from the top of the clarifier to a pH in the neutral range of 6-9 by adding a suitable mineral acid;
  h) introducing the pH-adjusted supernatant from the clarifier into a suitable filtration means in order to provide a softened and suspended solids-free Influent Water;
  i) preconditioning of said softened and suspended solids-free Influent Water by adding acid and antiscalant to produce a preconditioned Influent Water;
  j) introducing said preconditioned Influent Water into the high pressure side of a first stage RO membrane system (RO1) and pressurizing said preconditioned Influent Water to produce purified water permeate on the low pressure side that is substantially free of said inorganic compounds;
  k) removing first stage RO1 membrane concentrate containing preconcentrated soluble and sparingly soluble inorganic compounds from the high pressure side of said RO1 membrane system without precipitation of said preconcentrated sparingly soluble inorganic compounds on said RO1 membrane;
  l) recovering the bulk of purified water permeate on the low pressure side of said RO1 membrane at a rate at least 50% of the rate of said preconditioned Influent water;
  m) splitting said RO1 membrane concentrate into an RO1 membrane concentrate recycle stream which is recycled and blended with said Influent Water and an RO1 membrane concentrate stream for further softening and purified water recovery in the second stage RO membrane system (RO2);
  n) blending said RO1 membrane concentrate with the second stage RO membrane (RO2) concentrate recycle stream producing a blended stream containing elevated levels of sparingly soluble inorganic compounds;
  o) introducing said blended stream containing said elevated levels of sparingly soluble inorganic compounds into a suitable ion exchange softening means to provide a "blended and hardness-free" concentrate stream;
  p) introducing said "blended and hardness-free" concentrate into the high pressure side of a second stage RO membrane system (RO2) and pressurizing said blended and hardness-free concentrate to produce purified water permeate on the low pressure side of said RO2 membrane system that is substantially free of said inorganic compounds;
  q) removing RO2 membrane concentrate containing concentrated soluble and "under-saturated" sparingly soluble inorganic compounds from the high pressure side of said RO2 membrane system without precipitation of said sparingly soluble inorganic compounds on the surface of said RO2 membrane;
  r) recovering the remaining purified water permeate on the low pressure side of said RO2 membrane system at a rate at least 5% and up to 50% of the rate of said Influent Water;
  s) combining the purified water permeate from said RO1 membrane system with purified water permeate from said RO2 membrane system to provide the final purified water stream at a rate ranging from 67%-99.9% of the rate of the Influent water;
  t) splitting said RO2 membrane concentrate into an RO2 membrane concentrate recycle stream which is recycled and blended with said RO1 membrane concentrate, and a small RO2 membrane reject stream;
  u) adjusting the flowrate of said RO2 membrane reject stream to control the concentration of soluble inorganic compounds and hence the osmotic pressure;
  v) removing said slurry reject stream and small RO2 membrane reject stream from the process as final rejects for disposal or further treatment.

2. The process in accordance with claim 1 where the first stage contains a nanofiltration membrane (NF) and the second stage contains a reverse osmosis membrane (RO).

3. The process in accordance with claim 2 where said "blended and hardness-free" concentrate stream from said ion exchange softening means is introduced into a silica sequestering unit (SSU) containing granular activated alumina or other selective silica removing material to produce a "blended and hardness-free and silica-free" concentrate stream that is introduced into said high pressure side of said second stage RO membrane system (RO2) to produce further purified water permeate without precipitation of said sparingly soluble inorganic compounds on the surface of said RO2 membranes.

* * * * *